United States Patent Office 3,113,956
Patented Dec. 10, 1963

3,113,956
LOW VISCOSITY QUATERNARY AMMONIUM ETHOSULFATE COMPOSITIONS AND METHODS
Hillary Robinette, Jr., Philadelphia, Pa., assignor to Robinette Research Laboratories, Inc., Ardmore, Pa., a corporation of Pennsylvania
No Drawing. Filed Mar. 7, 1960, Ser. No. 12,939
15 Claims. (Cl. 260—459)

This invention relates to new products such as quaternary trialkyl ethyl ammonium ethosalts, to compositions containing such products, to methods of making such products and compositions, and to their utilization.

Although long chain quaternary ethosulfates have been known for some time, their use has been limited to those cases where the high viscosity of their aqueous solutions were acceptable.

Among the objects of the present invention is the production of quaternary trialkyl ethyl ammonium ethosalts having relatively low viscosities in aqueous solutions containing relatively high concentrations of quaternary ethosulfates. Such products are particularly useful in textile fiber processing, in the formulation of cosmetic lotions, and as components of detergent lubricating oils, and for other purposes. The invention also includes methods of making such products and compositions and their utilization.

Other objects will appear from the more detailed description set forth below which is given to illustrate the invention to those skilled in the art without limitation within the scope and spirit of the invention as set forth herein.

In accordance with the present invention, compositions are produced containing as an essential component, a quaternary trialkyl ethyl ammonium ethosulfate having one long chain alkyl and two short chain alkyl groups. Such quaternary derivatives have been found to exhibit unique properties and to be useful in a variety of ways, but particularly for imparting antistatic properties to textile fabrics, as cationic emulsifying agents for cosmetics, as components of detergent lubricating oils as in compounded mineral lubricating oils and for other purposes. Their relatively low viscosity in aqueous solutions containing relatively high concentrations of the stated quaternary ethosulfates of this invention make them desirable where such properties are sought as in textile fiber processing and in formulating cosmetic lotions.

The long chain alkyl groups desirably are those having from twelve to eighteen carbon atoms, although somewhat longer and somewhat shorter chains may be used. Such longer chain components may be either single compounds or mixtures of such long chain alkyls such as are derived from the mixtures of alkyls of fat and oil acids. These mixtures are illustrated by soya derived alkyls and are illustrative by dimethyl soya amine (Armour Company). Any of the longer alkyls such as lauryl, cetyl, etc. may be used including straight chain, branched chain, saturated and unsaturated. Exemplary products are soya dimethyl ethyl ammonium ethosulfate, lauryl dimethyl ethyl ammonium ethosulfate, and cetyl dimethyl ethyl ammonium ethosulfate.

The short chain alkyls include the lower alkyls for example methyl, ethyl, propyl, butyl, the iso and other branch chains, cycloalkyls etc., alone or in mixture.

The ratios of the reactants may vary but desirably stoichiometric proportions are employed. Thus products may be produced having reduced viscosity in aqueous solutions, by reacting the purified long chained tertiary amines with stoichiometric amounts of diethylsulfate in the presence of triethanolamine. Physical blends of quaternized tertiary amine (ethosulfate) and quaternized triethanolamine have been blended in various ratios. The resulting mixtures do not exhibit the low viscosity that is obtained when the subject products are prepared in situ. It was found necessary to include triethanolamine in the reaction mixture during quaternization in order to get products of a liquid nature when diluted with water to concentrations of about 10% to 75% active solids. In general, the lower molecular weight, that is C 12 compounds would remain liquid at the higher solids concentration, and the longer chain products, that is the soya C 18 compounds, remained liquid at concentrations up to about 50%. Of course, attendant increases in viscosity resulted in the higher concentrations.

In addition, this reaction may be carried out under controlled conditions conveniently and economically, without the use of inert diluents. It is known that inert diluents may be used in preparing quaternary ammonium salts. The patent and other literature have invariably indicated the necessity of using such diluents. A part of the novelty here is that in the present process the use of diluents may be eliminated. This, of course, results in a marked reduction in cost of manufacturing as well as eliminating the tedious necessity of removing and recovering a sometimes expensive solvent and effectively reduces the fire and explosive hazard.

An exemplary composition, which has been found to be commercially acceptable and a process for preparing it, is described in the following example:

5,050.00 pounds of distilled dimethylsoya amine (Armour Company) and 499.45 pounds triethanolamine were charged to a stainless steel reactor and agitated and heated to 195° Fahrenheit with steam and water in the jacket of the rector. When the temperature reached 195° Fahrenheit the jacket was drained and replaced with cooling water. The cooling water was allowed to flow constantly through the jacket during the addition of 3,094.85 pounds of diethylsulfate. The rate of addition of diethylsulfate was such as to maintain a batch temperature of 195° to 220° Fahrenheit. The rate of addition is dependent on the efficiency of the cooling water, and averages about 30 pounds per minute. The addition of the diethylsulfate is made with agitation. After addition of the diethylsulfate agitation is continued for one hour and then 16,053.70 pounds of water are added to reduce the composition to 35% solids. The resulting product was found to have a pH at 25° centigrade of 5.2 as determined with a glass calomel electrode. The viscosity of the product at 50° centigrade was 274 centipoises, determined with a Brookfield viscometer using the number 2 spindle at 20 r.p.m. The product had a Gardiner color of 6.

The characteristics of the product has varied as follows: pH of the 35% solution at 25° centigrade from 5 to 6.5; viscosity of the 35% solution at 50° centigrade from 238 to 280 centipoises, and the color from 4 to 8 Gardiner. All of the batches have been found to be commercially acceptable for use as a component of a fiber finish for imparting antistatic properties to the fiber, and for imparting cationic properties to cosmetic emulsions.

It has been shown that the viscosity control is imparted through the use of the calculated amount of triethanolamine. While other trialkanolamines where the alkanol moiety is lower alkyl such as triisopropanolamine may be used, the results with triethanolamine are outstanding and that reactant is employed to illustrate the invention. Products made in the laboratory from the distilled dimethylsoya amine and diethylsulfate in stoichiometric quantities without triethanolamine resulted in products forming solid gels at 35% concentration and so viscous that viscosity measurements could not be taken at 50° centigrade.

It has been found that 8 to 10% triethanolamine based on the weight of the distilled dimethylsoya amine is the optimum ratio for obtaining the product having the desirable physical characteristics of color and viscosity. Lower amounts down to about 2% and amounts in excess of 15% on the weight of the trialkylamine may be used, but with amounts in excess of 15%, no further reduction in viscosity seems apparent. The stoichiometric quantities of materials to be used are derived by predetermining the neutral equivalents of the distilled dimethylsoya amine or other trialkylamine used and the triethanolamine in calculating the quantity of diethylsulfate required. As an example, 5 grams of distilled dimethylsoya amine and 0.4945 gram of triethanolamine are titrated with 0.4843 normal hydrochloric acid. The molecular equivalent of the mixture is found to be 281.5. This mixture is reacted with 154.18 mol equivalents of diethylsulfate in accordance with the procedure described above.

Commercially, the products may be shipped as concentrates, i.e. the soya derivative, may be sold in 100% form or in concentrations of from 5% to 99% in water. The physical properties of the aqueous solutions are controlled by the effective attention to the determination of the stoichiometric ratios of reactants. Deviations may result in products having pH's of either higher or lower acidity and varying in viscosity. I have found that products essentially different from the product made in stoichiometric ratios may be less stable in that drifts in pH may occur and colors change. Variations of pH resulting from numerous experiments using stoichiometric quantities have been found in general best kept between pH 5 and pH 6.5.

I claim:

1. The method of preparing quaternary ammonium ethosalts which comprises heating in approximately stoichiometric quantities a trialkylamine, having a long chain alkyl and two short chain alkyl groups with diethyl sulfate in the presence of from about 2% to about 15% triethanolamine on the weight of the trialkylamine to form a reaction product containing quaternary ammonium ethosalt of substantially low viscosity in aqueous solution.

2. The method of claim 1 in which the temperature of reaction is approximately between 195° F. to 220° F.

3. The method of claim 2 in which the rate of addition of diethyl sulfate to a heated mixture of trialkyl amine and ethanolamine controls the temperature of the reaction mixture.

4. The method of claim 3 in which the reaction product is diluted with water.

5. The method of claim 4 in which the trialkylamine is dimethyl soya amine and the reaction product is quaternary soya dimethyl ethyl ammonium ethosulfate.

6. The method of claim 4 in which the trialkylamine is dimethyl lauryl amine and the reaction product is quaternary lauryl dimethyl ethyl ammonium ethosulfate.

7. The method of claim 4 in which the trialkylamine is dimethyl cetyl amine and the reaction product is quaternary cetyl dimethyl ethyl ammonium ethosulfate.

8. A composition containing as an essential component thereof quaternary trialkyl ethyl ammonium ethosulfate having one alkyl group of from 12 to 18 carbon atoms and two alkyl, produced by the method of claim 1 groups of lower alkyl.

9. The composition of claim 8 in which the essential component is quaternary soya dimethyl ethyl ammonium ethosulfate.

10. The composition of claim 8 in which the essential component is quaternary lauryl dimethyl ethyl ammonium ethosulfate.

11. The composition of claim 8 in which the essential component is quaternary cetyl dimethyl ethyl ammonium ethosulfate.

12. The composition of claim 8 including water as the major component and the ethosulfate as the minor component.

13. The composition of claim 12 in which the essential component is quaternary soya dimethyl ethyl ammonium ethosulfate.

14. The composition of claim 12 in which the essential component is quaternary lauryl dimethyl ethyl ammonium ethosulfate.

15. The composition of claim 12 in which the essential component is quaternary cetyl dimethyl ethyl ammonium ethosulfate.

References Cited in the file of this patent

UNITED STATES PATENTS

| | | |
|---|---|---|
| 2,295,505 | Shelton | Sept. 8, 1942 |
| 2,392,585 | Fryling | Jan. 8, 1946 |
| 2,435,583 | Gump | Feb. 10, 1948 |
| 2,569,326 | Niederl et al. | Sept. 25, 1951 |
| 2,742,393 | Bernstein et al. | Apr. 17, 1956 |

FOREIGN PATENTS

| | | |
|---|---|---|
| 153,801 | Sweden | Mar. 20, 1956 |

OTHER REFERENCES

Shiono: C. A., vol. 44, pages 5544–5545 (1950).
Weil et al.: J. Am. Oil Chemists' Soc., vol. 36, pages 241–244 (1959).

UNITED STATES PATENT OFFICE
CERTIFICATE OF CORRECTION

Patent No. 3,113,956            December 10, 1963

Hillary Robinette, Jr.

It is hereby certified that error appears in the above numbered patent requiring correction and that the said Letters Patent should read as corrected below.

Column 4, lines 12 and 13, strike out "atoms and two alkyl, produced by the method of claim 1 groups of lower alkyl." and insert instead -- atoms and two alkyl groups of lower alkyl, produced by the method of claim 1. --.

Signed and sealed this 28th day of April 1964.

(SEAL)
Attest:

ERNEST W. SWIDER
Attesting Officer

EDWARD J. BRENNER
Commissioner of Patents